(12) United States Patent
Reitinger et al.

(10) Patent No.: US 12,534,151 B2
(45) Date of Patent: Jan. 27, 2026

(54) ELECTRIC MOTORCYCLE

(71) Applicant: LiveWire EV, LLC, Milwaukee, WI (US)

(72) Inventors: Samuel Nicholas Reitinger, Wauwatosa, WI (US); Erik James Lewis, Waukesha, WI (US); Mark Gales, Franklin, WI (US); Matthew Anchor, Elm Grove, WI (US)

(73) Assignee: LiveWire EV, LLC, Milwaukee, WI (US)

( * ) Notice: Subject to any disclaimer, the term of this patent is extended or adjusted under 35 U.S.C. 154(b) by 446 days.

(21) Appl. No.: 18/180,468

(22) Filed: Mar. 8, 2023

(65) Prior Publication Data
US 2024/0300605 A1  Sep. 12, 2024

(51) Int. Cl.
*B62J 43/16* (2020.01)
*B60L 53/20* (2019.01)
*B62M 7/02* (2006.01)

(52) U.S. Cl.
CPC ............ *B62J 43/16* (2020.02); *B60L 53/20* (2019.02); *B62M 7/02* (2013.01)

(58) Field of Classification Search
CPC .................... B62M 7/02; B62J 43/28
See application file for complete search history.

(56) References Cited

U.S. PATENT DOCUMENTS

| 5,501,292 | A | 3/1996 | Kawashima et al. |
| 6,326,765 | B1 | 12/2001 | Hughes et al. |
| 6,341,660 | B1 | 1/2002 | Schiller |
| 8,789,640 | B2 | 7/2014 | Matsuda |
| 8,899,369 | B2 * | 12/2014 | Matsuda ............... B62K 11/00 180/220 |
| 8,973,689 | B2 | 3/2015 | Plazotta et al. |
| 9,027,694 | B2 | 5/2015 | Matsuda |
| 9,132,878 | B2 | 9/2015 | Matsuda |
| 9,211,934 | B2 | 12/2015 | Eguchi |
| 9,238,495 | B2 | 1/2016 | Matsuda |
| 9,238,497 | B2 | 1/2016 | Matsuda |
| 9,278,725 | B2 | 3/2016 | Matsuda |
| 9,308,966 | B2 | 4/2016 | Kosuge et al. |

(Continued)

FOREIGN PATENT DOCUMENTS

| CN | 108357607 A | 8/2018 |
| CN | 114030549 A | 2/2022 |

(Continued)

OTHER PUBLICATIONS

European Patent Office Action for Application No. 24162410.5 dated Sep. 9, 2024 (14 pages).

(Continued)

*Primary Examiner* — Valentin Neacsu
*Assistant Examiner* — Hosam Shabara
(74) *Attorney, Agent, or Firm* — Michael Best & Friedrich LLP

(57) ABSTRACT

An electric motorcycle includes an electric motor configured to provide propulsion of the motorcycle, and a battery pack with a battery case. The electric motor and the battery case are coupled together to define an overlapping area. In the overlapping area, the battery case includes an integrated junction box for one or more electrical connections to the electric motor.

20 Claims, 9 Drawing Sheets

(56) References Cited

U.S. PATENT DOCUMENTS

| | | | |
|---|---|---|---|
| 9,669,898 | B2 | 6/2017 | Miyashiro |
| 9,821,882 | B2 | 11/2017 | Matsuda |
| 9,821,883 | B2 | 11/2017 | Blasco Gracia et al. |
| 9,840,306 | B2 | 12/2017 | Matsuda |
| 10,259,530 | B2 | 4/2019 | Matsuda |
| 10,611,425 | B2* | 4/2020 | Miyashiro ............... B60K 1/04 |
| 11,260,934 | B2 | 3/2022 | Reitinger et al. |
| 11,634,191 | B2* | 4/2023 | Nesbitt, III ............ B62K 11/02 |
| | | | 180/220 |
| 2003/0213632 | A1 | 11/2003 | Schless |
| 2004/0036251 | A1 | 2/2004 | Baldwin |
| 2010/0018787 | A1 | 1/2010 | Plazotta et al. |
| 2012/0103716 | A1* | 5/2012 | Fujihara ................. B62J 50/30 |
| | | | 180/220 |
| 2013/0032424 | A1 | 2/2013 | Sand |
| 2013/0168172 | A1 | 7/2013 | Buell et al. |
| 2013/0270021 | A1 | 10/2013 | Kubanek et al. |
| 2014/0015455 | A1* | 1/2014 | Yonehana ............... B60L 50/51 |
| | | | 318/139 |
| 2015/0075889 | A1 | 3/2015 | Eguchi |
| 2015/0122562 | A1 | 5/2015 | Miyashiro |
| 2015/0122563 | A1 | 5/2015 | Kondo et al. |
| 2015/0122568 | A1 | 5/2015 | Eguchi |
| 2015/0122570 | A1 | 5/2015 | Miyashiro |
| 2015/0251540 | A1 | 9/2015 | Matsuda |
| 2016/0280306 | A1 | 9/2016 | Miyashiro et al. |
| 2020/0216138 | A1 | 7/2020 | Reitinger et al. |
| 2020/0231241 | A1 | 7/2020 | Knitt et al. |
| 2021/0016852 | A1 | 1/2021 | Nesbitt, III |
| 2022/0177070 | A1 | 6/2022 | Reitinger et al. |
| 2023/0097080 | A1 | 3/2023 | Zelioli |
| 2024/0300605 | A1 | 9/2024 | Reitinger et al. |

FOREIGN PATENT DOCUMENTS

| | | |
|---|---|---|
| CN | 117622367 A | 3/2024 |
| DE | 102011078265 B3 | 6/2012 |
| DE | 102014215936 A1 | 3/2015 |
| DE | 102014015306 A1 | 4/2016 |
| EP | 2546130 A1 | 1/2013 |
| EP | 2143627 B1 | 9/2013 |
| EP | 2692572 A1 | 2/2014 |
| EP | 2905167 A1 | 8/2015 |
| EP | 2905168 A1 | 8/2015 |
| EP | 2670655 B1 | 4/2016 |
| EP | 2799325 B1 | 8/2016 |
| EP | 2799319 B1 | 11/2016 |
| EP | 2799321 B1 | 11/2016 |
| EP | 3088288 A2 | 11/2016 |
| EP | 3049267 B1 | 1/2018 |
| EP | 2905166 B1 | 3/2018 |
| EP | 2905161 B1 | 3/2019 |
| ES | 2532651 A1 | 3/2015 |
| JP | S5180848 U | 6/1976 |
| JP | 2000038184 A | 2/2000 |
| JP | 5700823 B2 | 4/2015 |
| JP | 5860544 B2 | 2/2016 |
| JP | 5889422 B2 | 3/2016 |
| JP | 5898778 B2 | 4/2016 |
| JP | 2016203954 A | 12/2016 |
| JP | 2017190071 A | 10/2017 |
| NL | 2017515 B1 | 3/2018 |
| NL | 2018466 B1 | 3/2018 |
| WO | 2019170306 A1 | 9/2019 |
| WO | 2020012791 A1 | 1/2020 |
| WO | 2022099910 A1 | 5/2022 |

OTHER PUBLICATIONS

Anderson, "Voltra," <https://vignette.wikia.nocookie.net/openmotox/images/c/c2/DA_Voltra3.jpg/revision/latest?cb=20100506113837> © 2009 (9 pages).

Anderson, "Voltra Motorcycle," <https://www.coroflot.com/DanAnderson/Voltra-Motorcycle-> web article dated Nov. 25, 2009 (10 pages).

Hancocks, "Zero SR/F (2019) Reveal and Specs," <https://www.visordown.com/news/new-bikes/zero-srf-2019-reveal-and-specs> web article dated Feb. 25, 2019 (3 pages).

Brasfield, "Exclusive: 2019 Zero SR/F Review—First Ride," <https://www.motorcycle.com/manufacturer/zero/exclusive-2019-zero-sr-f-review-first-ride.html> web article dated Feb. 25, 2019 (19 pages).

Richard, "Mission One by Mission Motors: The World's Fastest Production Electric Motorcycle," <https://www.treehugger.com/cars/mission-one-by-mission-motors-the-worlds-fastest-production-electric-motorcycle.html> web article dated Feb. 4, 2009 (3 pages).

Dillard, "Motoczysz Frame" <https://evmc2.wordpress.com/2010/01/03/motoczysz-frame/> web article dated Jan. 3, 2010 (1 page).

HomeArticlesDailies, "MotoCzysz Electric D1g1tal Dr1ve: plug-and-play 100 HP electric powertrain," <https://www.rideapart.com/news/258962/motoczysz-electric-d1g1tal-dr1ve-plug-and-play-100-hp-electric-powertrain/> web article dated Feb. 27, 2010 (5 pages).

O'Kane, "Lightning's Strike electric motorcycle starts at $13,000 and will last at least 70 miles," <https://www.theverge.com/2019/3/28/18286072/lightning-strike-electric-motorcycle-specs-price> web article dated Mar. 28, 2019 (4 pages).

Damon, "Transforming Electric Motorcycles," <https://www.damon.com> web page visited Jan. 13, 2023 (10 pages).

European Patent Office Action for Application No. 24162390.9 dated Aug. 13, 2024 (9 pages).

* cited by examiner

ELECTRIC MOTORCYCLE

BACKGROUND

The present invention relates to vehicles, and more particularly relates to electric motorcycles and the construction thereof.

SUMMARY

In one aspect, the invention provides an electric motorcycle including an electric motor configured to provide propulsion of the motorcycle. A battery pack includes a battery case. The electric motor and the battery case are coupled together to define an overlapping area. In the overlapping area, the battery case includes an integrated junction box for one or more electrical connections to the electric motor.

In another aspect, the invention provides an electric motorcycle including a battery pack including a plurality of rechargeable electrochemical cells received within an internal cell cavity of a battery case. An electric motor is connected to receive stored energy from the plurality of rechargeable electrochemical cells, the electric motor having an output on a drive side thereof connected to drive a wheel of the motorcycle. The electric motor is coupled to a motor mounting portion of the battery case extended from the cell cavity. A cable connected to the electric motor to supply electrical power to drive the electric motor is concealed within the motor mounting portion.

In yet another aspect, the invention provides an electric motorcycle including a battery pack including a plurality of rechargeable electrochemical cells received within an internal cell cavity of a battery case. An electric motor is connected to receive stored energy from the plurality of rechargeable electrochemical cells, the electric motor having an output on a drive side thereof connected to drive a wheel of the motorcycle. A rear wheel is drivably coupled to the electric motor output on the drive side to propel the motorcycle. A power electronics housing separate from the battery pack and the electric motor contains an inverter electrically connected to both the battery pack and the electric motor for discharging power from the battery pack to the electric motor to provide propulsion of the electric motorcycle. Separate from the internal cell cavity, the battery case provides an integrated junction box that provides sealed passage of all electrical connections between the battery pack and the inverter and all electrical connections between the inverter and the electric motor. The integrated junction box is provided alongside a non-drive side of the electric motor.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
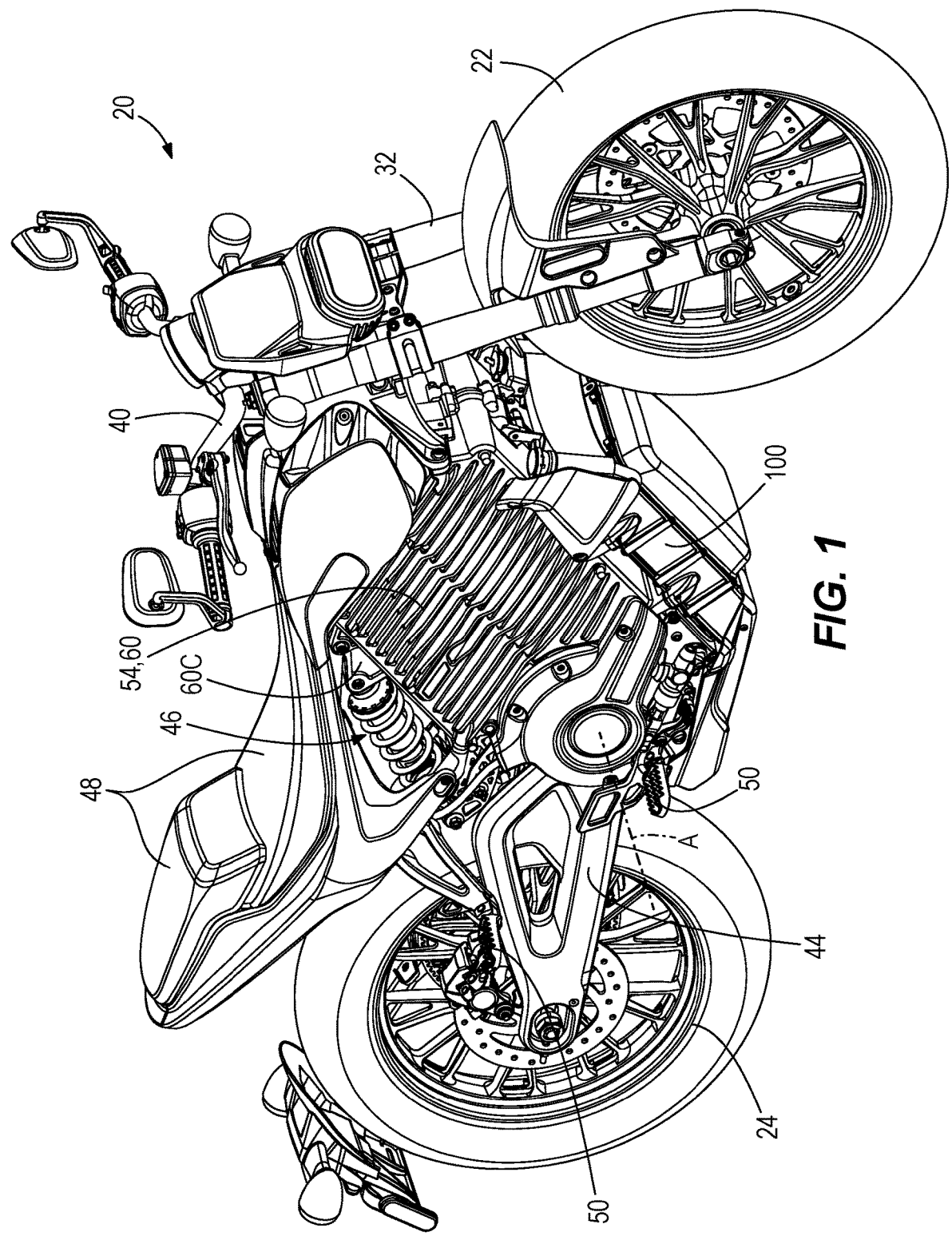
FIG. 1 is a right side perspective view of a motorcycle according to one embodiment of the present disclosure.

FIG. 1 illustrates a motorcycle 20 according to one embodiment of the present disclosure. The motorcycle 20 includes front and rear wheels 22, 24 (e.g., a single front wheel 22 and a single rear wheel 24 aligned with the front wheel 22 to define a single track). The motorcycle 20 includes a frame structure devoid of a conventional main frame, which is described in further detail below. A front fork 32 supports the front wheel 22 and allows rotation of the front wheel 22 along the road surface. The front fork 32 is rotatably coupled to a head tube 36 of the frame for steering control of the front wheel 22. Handlebars 40 are coupled to the front fork 32 to allow a rider to control the orientation of the front fork 32 and the front wheel 22. A rear swingarm 44 supports the rear wheel 24 for rotation therein, the rear swingarm 44 enabling pivoting suspension movements of the rear wheel 24 and the swingarm 44 together about an axis A. In addition to the pivoting support at the axis A, the swingarm 44 is supported by a shock absorber unit 46 (e.g., including a coil spring and a hydraulic damper). The motorcycle 20 further includes at least one seat 48 (e.g., saddle seat(s) for operator and optionally pillion passenger) and at least one set of foot supports 50 (e.g., laterally extending foot pegs).

Figure 2:
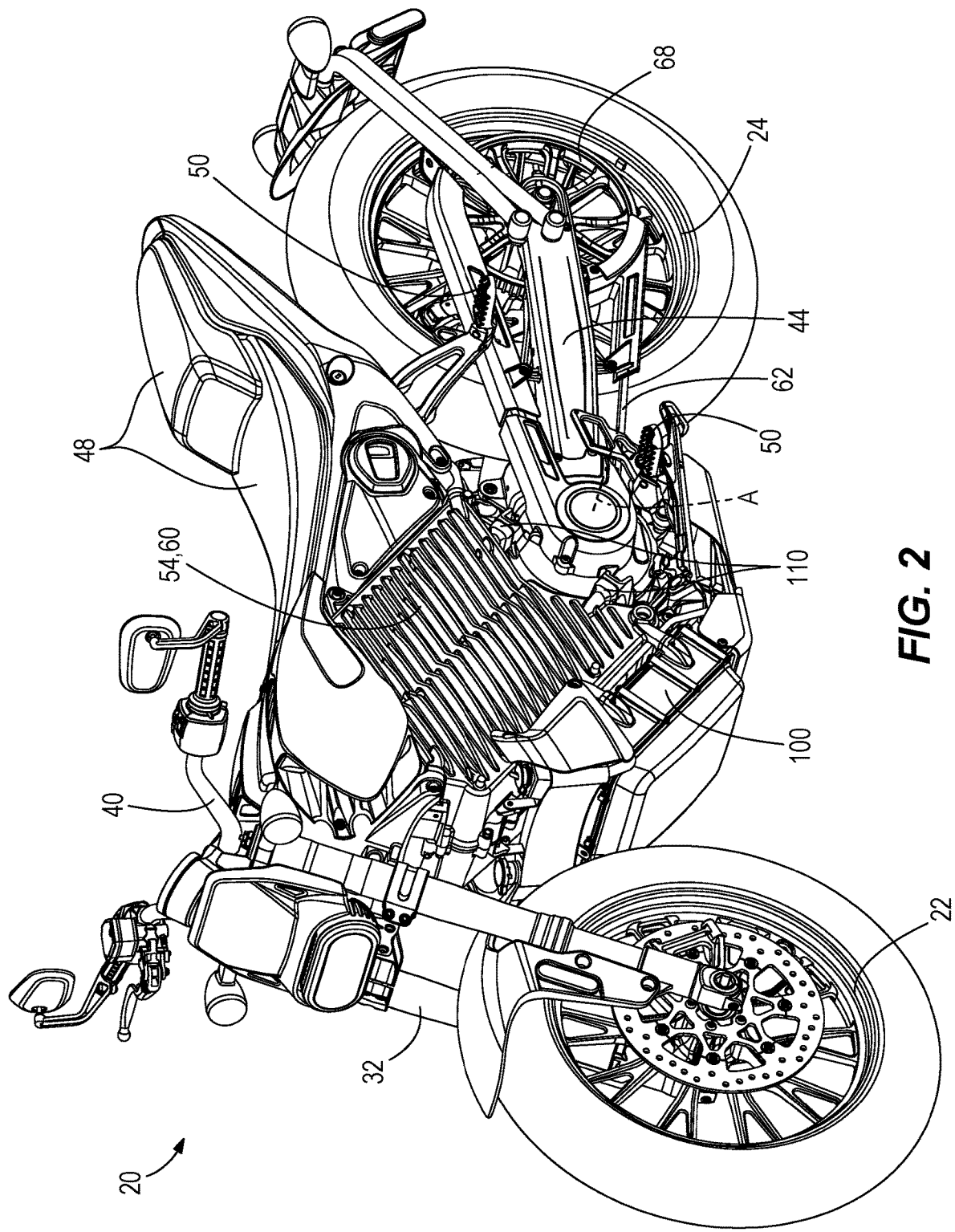
FIG. 2 is a left side perspective view of the motorcycle of FIG. 1.
Figure 3:
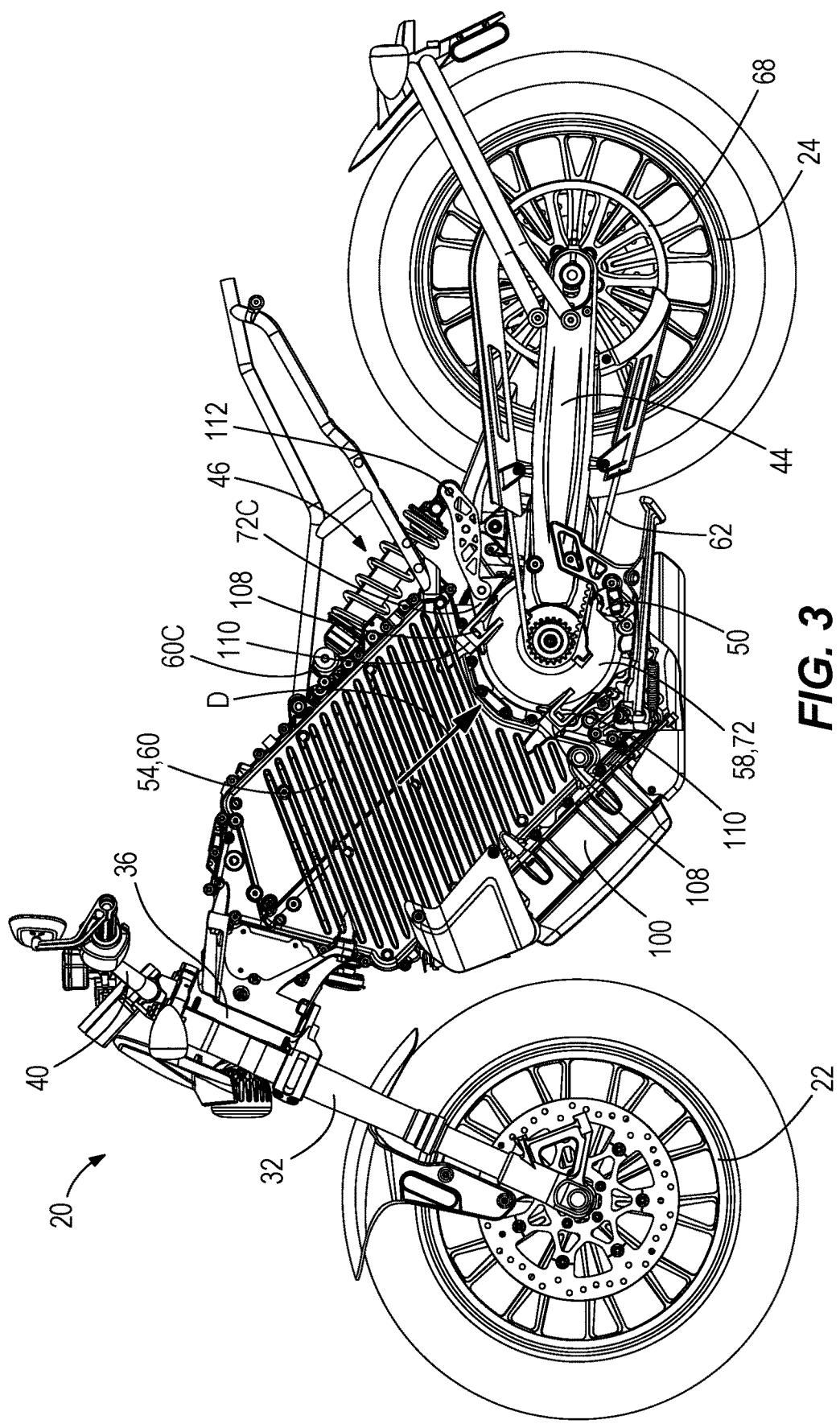
FIG. 3 is a left side elevation view of the motorcycle of FIG. 1, with several portions removed to better illustrate the underlying chassis structure thereof.
Figure 9:
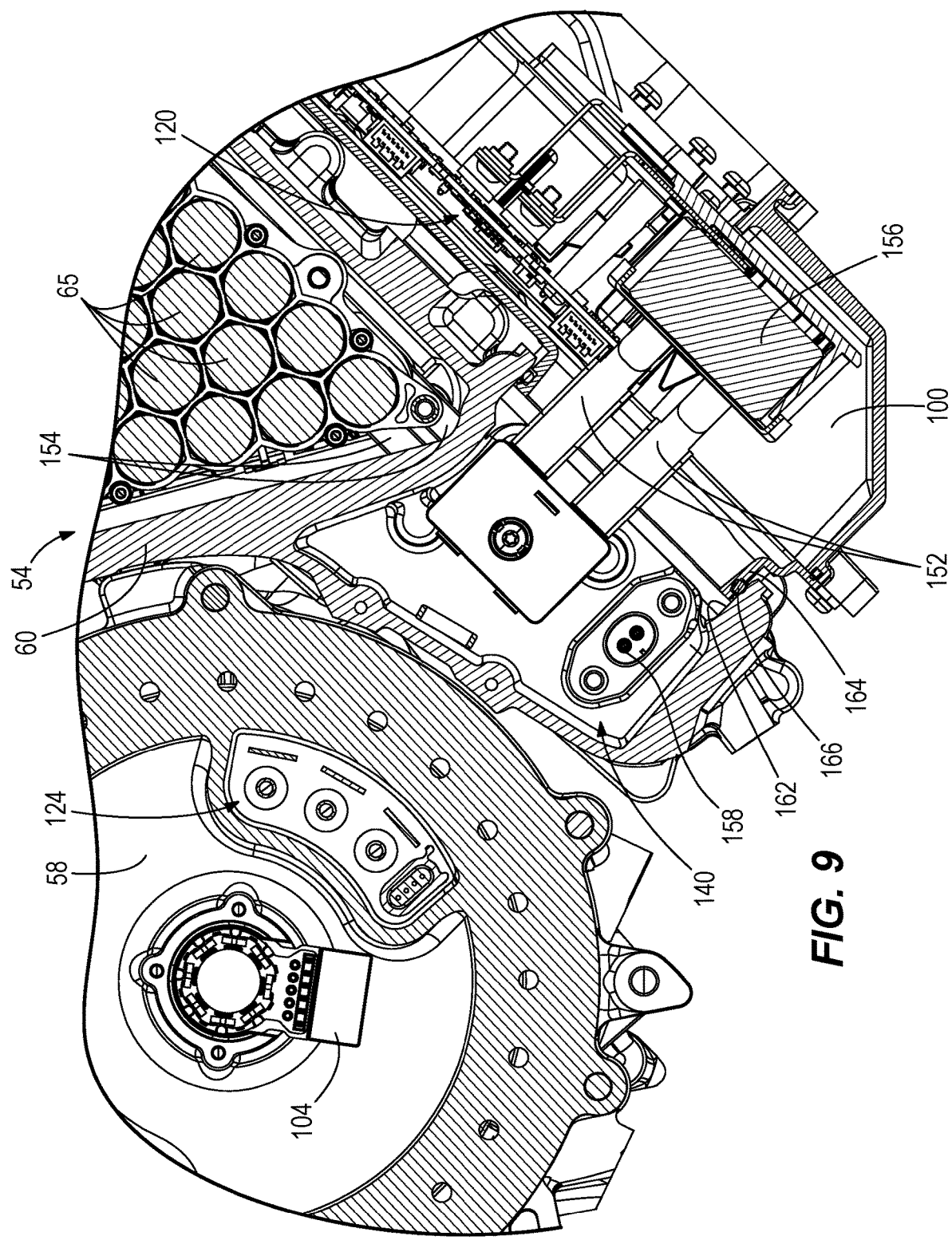
FIG. 9 is a cross-section view taken along a longitudinal plane between the motor phase leads (not shown) and the battery connection.

As illustrated, the motorcycle 20 is an electric motorcycle operable to drive by an electric powertrain including a rechargeable energy storage system ("battery pack 54") and an electric motor 58 electrically coupled to the battery pack 54 to convert stored electrical energy from the battery pack 54 into rotational kinetic energy for driving the motorcycle 20. The battery pack 54 includes a hollow battery case 60 defining an internal cell cavity in which a plurality of rechargeable electrochemical cells 65 are received (FIG. 9). As illustrated, the motor 58 powers the rear wheel 24 through an endless drive member 62 (e.g., belt or chain) in the form of a loop wrapped around a drive sprocket 66 (FIG. 5) and a driven sprocket 68 that is fixedly secured to the rear wheel 24 (FIGS. 2 and 3). As discussed in further detail below, the drive sprocket 66 that drives the endless drive member 62 is positioned to rotate about the axis A, which is also the pivot of the swingarm 44. Further, the drive sprocket 66 is fixed to rotate integrally with an output shaft 70 (FIG. 5) of the electric motor 58 about the axis A. As such, the motorcycle 20 is provided without a multi-speed transmission between the electric motor 58 and the drive sprocket 66, and without any gearbox whatsoever. This may further be facilitated by providing the electric motor 58 as a high pole count motor having high torque density. As can be appreciated from the drawings, the motor output axis A is oriented transverse to a longitudinal travel axis of the motorcycle 20.

Pivoting the swingarm 44 co-axially with the motor output axis A, as opposed to having a separate pivot shaft defining a swingarm pivot axis, enables the motorcycle 20 to accommodate a wide range of suspension travel as it eliminates variation in center distance between the drive sprocket 66 and the driven sprocket 68 throughout the travel of the swingarm 44. Tension in the endless drive member 62 does not vary with suspension travel, and this improves durability while allowing the tension to be optimized for efficiency A housing or case 72 of the electric motor 58 is provided to contain the motor's rotor 86 to which the output shaft 70 is fixed for rotation about the axis A. The rotor 86 is a rotating assembly, for example including permanent magnets, that is driven to rotate relative to a stator 87 and the motor case 72 when the motor 58 is energized. The motor case 72 can be formed in multiple pieces that join together for assembly, for example parallel to the axis A. The output shaft 70 exits through an external, laterally-projecting boss 82 on the drive side of the motor case 72. The motor 58 is energized with electrical power from the cells of the battery pack as supplied in a controlled manner through power electronics (e.g., including an inverter). The power electronics can be provided within a housing 100, which can be provided separately from the battery case 60. The power electronics housing 100 can be positioned along a forward-facing side of the battery case 60 (and secured thereto). The power electronics housing 100 can be positioned adjacent a bottom end of the forward-facing side of the battery case 60 as shown. The power electronics housing 100 can contain one or any combination of: the inverter, the charger, and the DC/DC converter, among others. The components in the power electronics housing 100 generally constitute a power electronics controller operable to control the electrical power between the battery pack 54 and the motor 58, and also between the battery pack 54 and outside (grid) power selectively coupled for charging. The power electronics enclosure 100 can be provided by one or more individual pieces coupled together.

Figure 4:
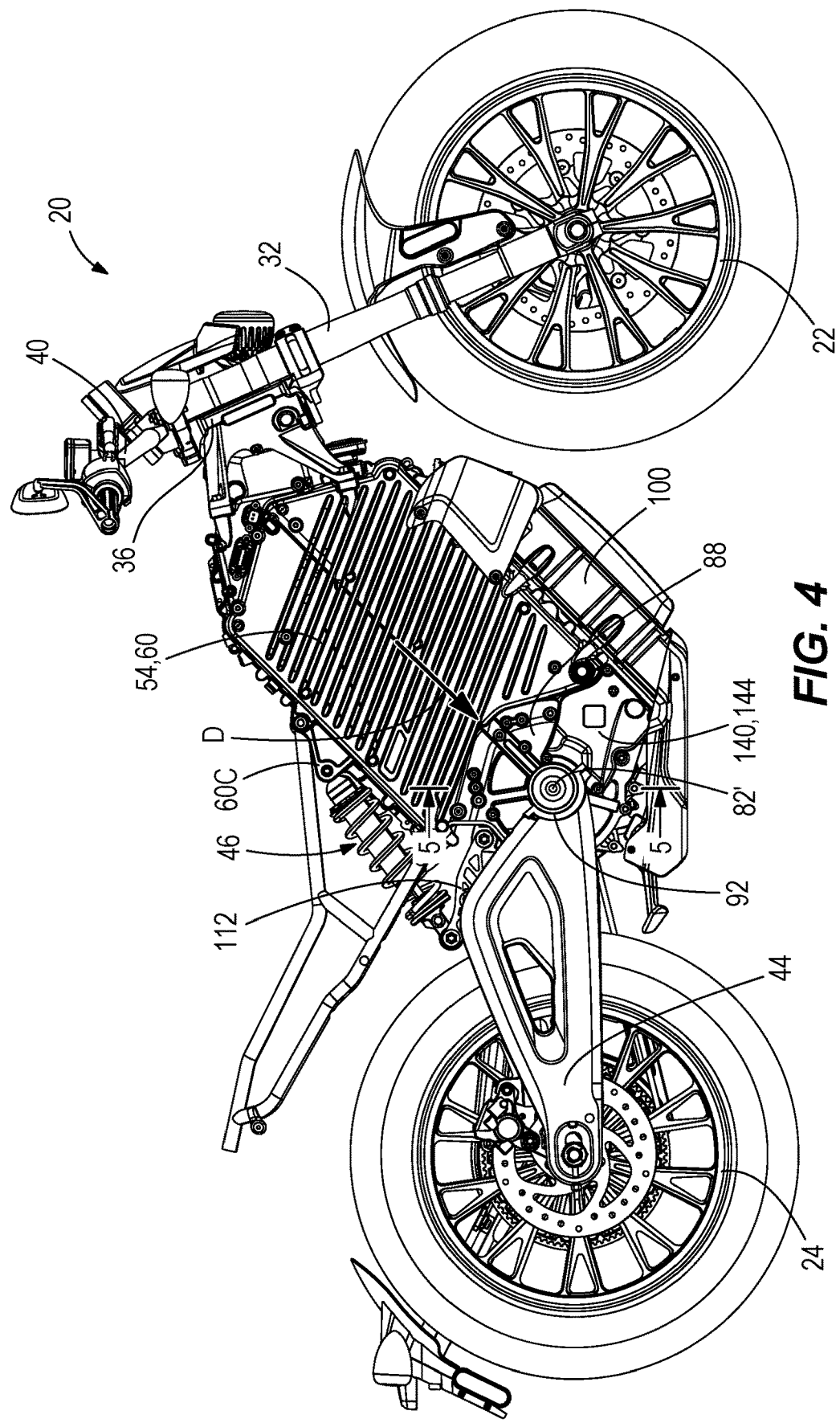
FIG. 4 is a right side elevation view of the motorcycle of FIG. 1, with several portions removed to better illustrate the underlying chassis structure thereof.
Figure 6:
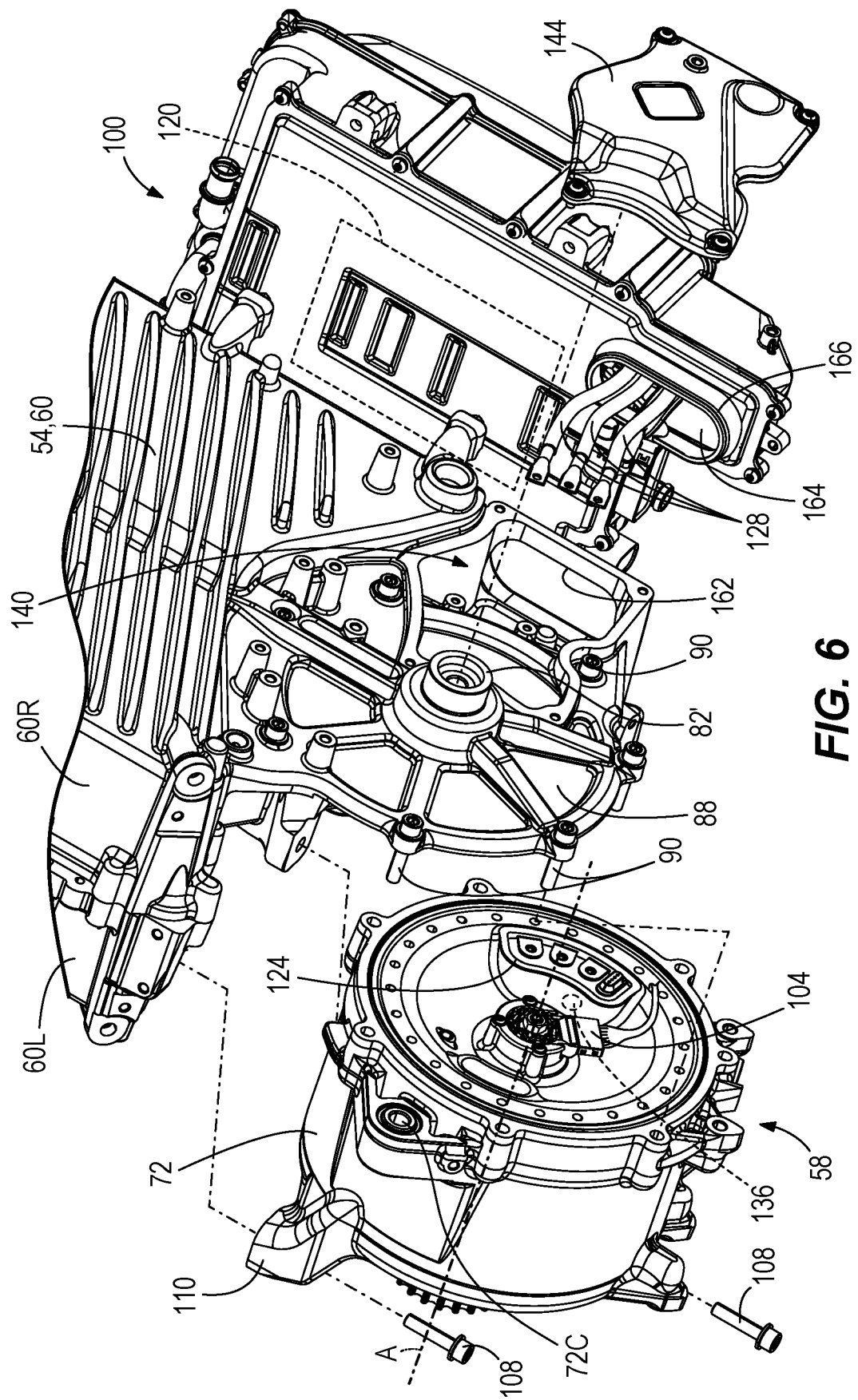
FIG. 6 is an exploded assembly view of the drive motor, along with a battery pack housing and a power electronics housing of the motorcycle of FIGS. 1-4.
Figure 7:
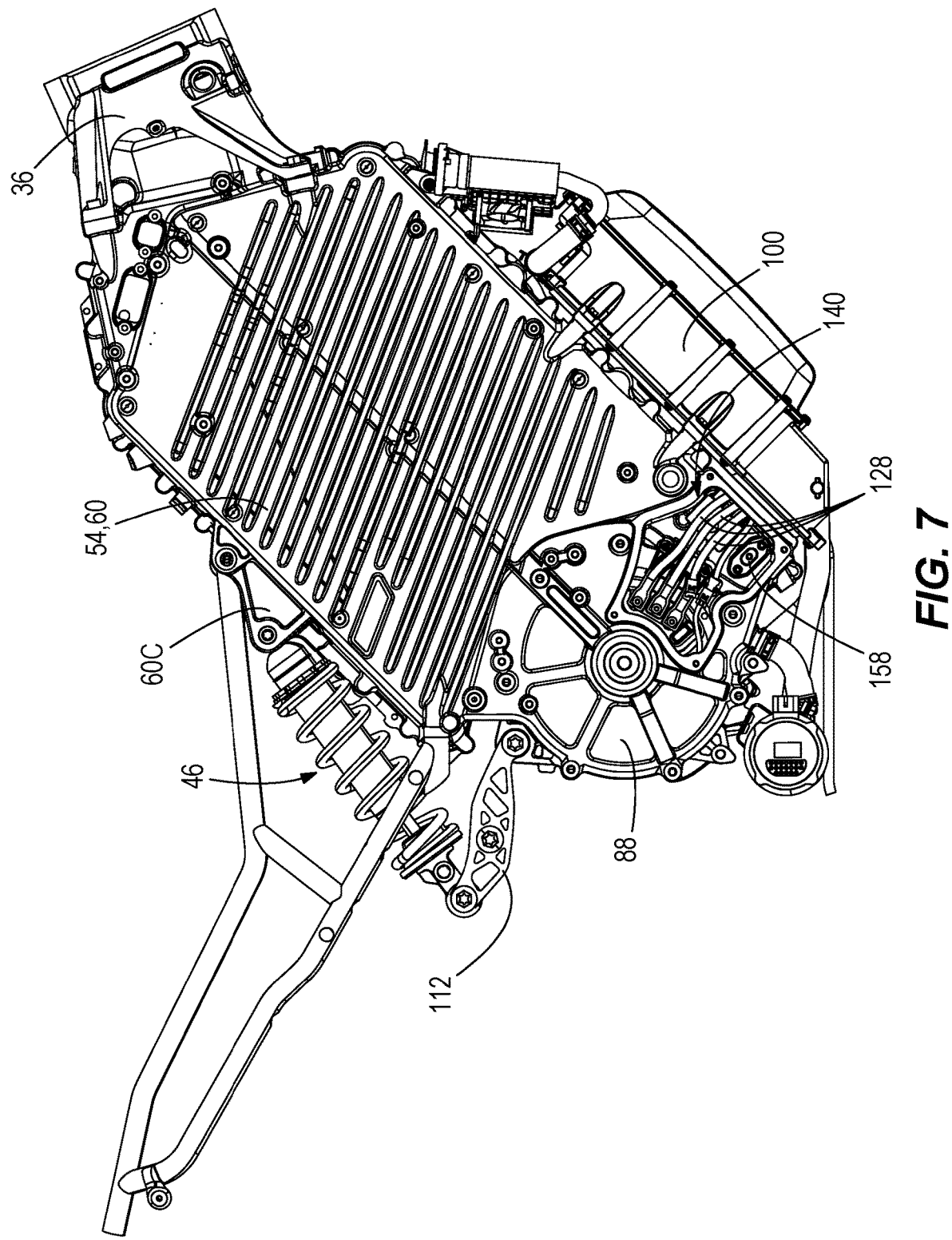
FIG. 7 is a right side elevation view similar to FIG. 4, but with a cover removed to illustrate electrical connections to a power electronics controller within an integral cavity of the battery pack housing.

FIGS. 3 and 4 are side views of the motorcycle 20 in which some elements have been removed to better illustrate the underlying chassis structure, which as mentioned earlier, is constructed without any main frame between the front and rear wheels 22, 24. Rather, a rigid structural connection between the supports of the wheels 22, 24 is provided by the battery case 60 and the case 72 of the electric motor 58. Although the battery case 60 can be provided with an integrated support for the front fork 32 in some constructions, the head tube 36 of the illustrated embodiment is a separate casting or machined component, secured to the front end of the battery case 60 with a plurality of fasteners. In any case, the only frame of the motorcycle 20 that extends all the way from the head tube 36 to the structural frame supports of the rear swingarm 44 is the battery case 60. As depicted in FIG. 6, the battery case 60 is constructed in two separate portions 60L, 60R that join laterally towards each other to form the internal cell cavity. The portions may be referred to as left and right shells or halves 60L, 60R, although they may or may not be divided equally or exactly at a lateral centerline of the motorcycle 20. The two separate portions 60L, 60R of the battery case 60 can be rigidly and sealingly joined together by fasteners and/or adhesive at a mutual interface. In some constructions, the battery case 60 is cast aluminum, including for example a first casting for the left battery case shell 60L and a second casting for the right battery case shell 60R. The battery case 60 extends from the head tube 36 generally rearwardly and downwardly, in a diagonal direction D toward the axis A. As described in further detail below, the front, bifurcated end of the swingarm 44 is pivotally supported on the motorcycle frame by swingarm mounts including a first swingarm mount provided by the boss 82 of the motor case 72 and a second swingarm mount 82' of the battery case 60. At each swingarm mount 82, 82', the front end of the swingarm 44 is pivotally supported (e.g., through a bearing 92 such as a roller bearing). The front end of the swingarm 44 can include removable bearing clamps to allow assembly around outer portions of the bearings 92.

Figure 5:
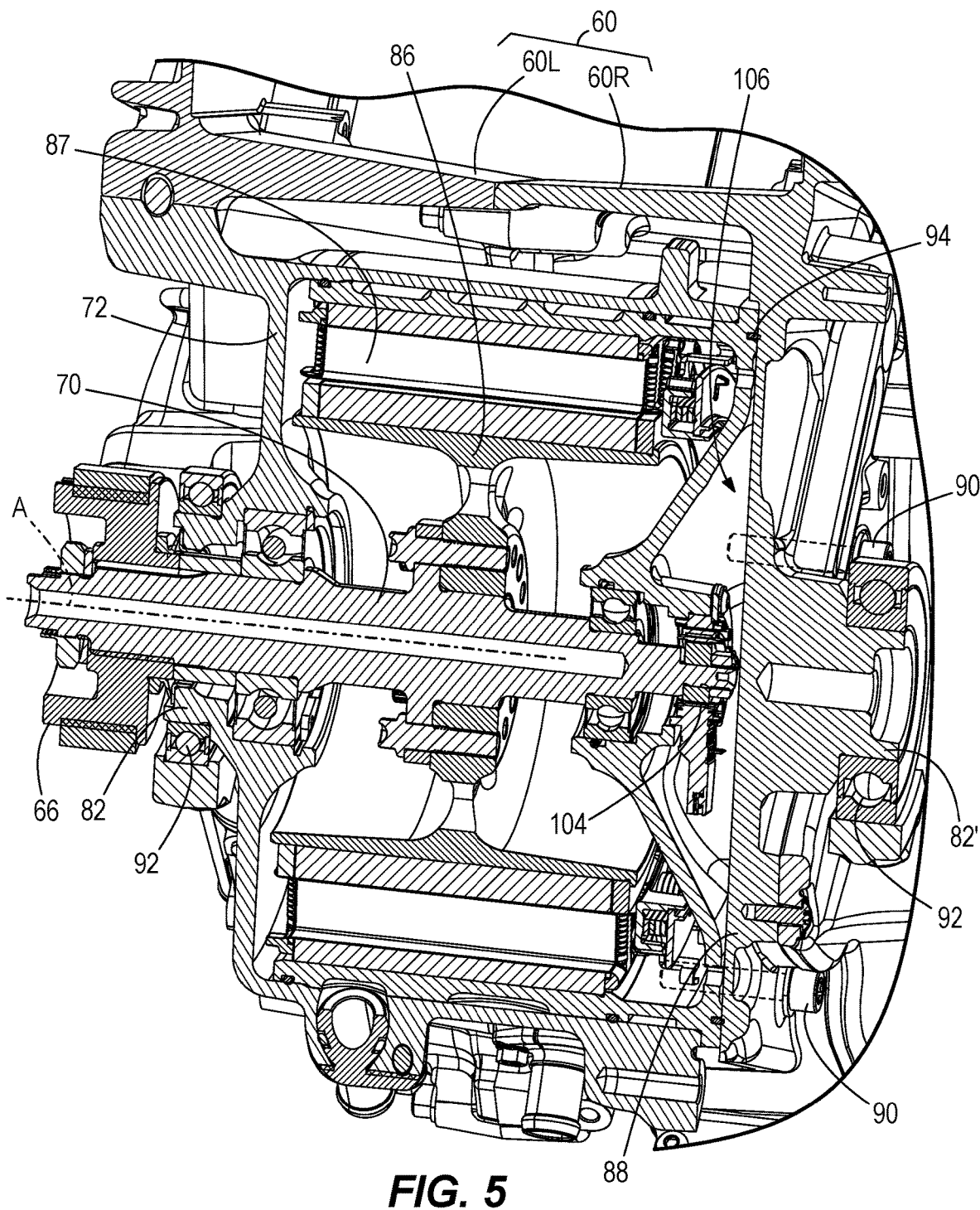
FIG. 5 is a cross-section view through the center of a drive motor of the motorcycle, taken along line 5-5 of FIG. 4.

As shown in the cross-section of FIG. 5 among others, the first swingarm mount 82 is integrally formed in the motor case 72 as a laterally-protruded boss. The first swingarm mount 82 is on a drive side of the motorcycle 20—that is, the side having the sprockets 66, 68 and the endless drive member 62 according to the illustrated construction. As such, the motor output shaft 70 extends out of the motor case 72 through the first swingarm mount 82. In the illustrated construction, the drive side is on the (rider's) left side, although this may be reversed in other constructions. The second swingarm mount 82', which is on the non-drive side of the motorcycle 20, is integrally formed with the battery case 60, particularly the right battery case shell 60R in the illustrated construction. The battery case shell 60R, compared to the other battery case shell 60L, can be extended farther in the diagonal direction D so as to overlap with the electric motor 58 in side view (FIG. 4). In contrast, in the opposite side view (FIG. 3), the battery case shell 60L joins with the motor case 72 without overlap, instead leaving the motor case 72 exposed. The extended motor-overlapping portion of the right battery case shell 60R provides a motor mounting portion or motor flange 88, which is exclusive to one lateral side (e.g., the non-drive side). The motor flange 88 extends generally longitudinally, or in other words parallel to a longitudinal center plane of the motorcycle 20.

The motor case 72 is joined (e.g., with a plurality of fasteners 90) with the battery case 60 at the motor flange 88 to form or establish the frame of the motorcycle 20. Particularly, the motor case 72 of the motor 58 and the motor flange 88 are clamped together in a transverse horizontal direction, parallel to the axis A. An intermediate seal 94 can be provided between the motor case 72 and the motor flange 88. The motor flange 88, in side view, covers at least a portion of the electric motor 58 and extends away from the internal cell cavity of the battery case 60. In other words, the motor flange 88, while integral with the right battery case shell 60R, is separate from the portion that retains the battery cells. The motor flange 88 extends away from the cell cavity at least to the rotation axis A of the electric motor 58. As illustrated, the motor flange 88 covers an entire circular periphery, or side-view profile, of the electric motor 58. The seal 94 and the pitch circle of the plurality of fasteners 90 are arranged to circumscribe the circular periphery of the motor case 72.

The motor flange 88 can be an entirely or predominantly solid wall. When joined together, the motor flange 88 and an axial end wall of the motor case 72 can leave a space 106 in the form of a cavity or pocket that is sealed from the environment. This space 106 between the motor case 72 and the motor flange 88 of the battery case 60 can accommodate one or more electrical components and/or connections on the motor 58. In particular, FIG. 5 illustrates a motor speed sensor 104 positioned in the space 106 between the motor case 72 and the motor flange 88. The motor speed sensor 104 is operable (e.g., magnetically, optically, etc.) to detect rotational position, and thus speed, of the output shaft 70. As shown, the non-drive end of the output shaft 70 can protrude through the axial end wall of the motor case 72 to provide the portion detectable by the motor speed sensor 104. It should be noted that the motor flange 88 can be provided in alternate shapes and configurations to that shown, and the motor flange 88 can include one or more apertures or windows exposing one or more portions of the motor case 72 in side view.

As noted above, the battery case 60 and the electric motor case 72 are structurally secured together at the non-drive side by the plurality of fasteners 90. The plurality of fasteners 90 extend parallel to the axis A, and thus, perpendicular to the longitudinal travel direction of the motorcycle 20. On the lateral side opposite the motor flange 88 (the non-drive side), the motor case 72 is secured to the battery case 60 with at least one (e.g., two or more) additional fastener 108. The fasteners 108 extend along an axis perpendicular to the axis A. Although a fastener may be arranged to intersect the axis A in other embodiments, the illustrated fasteners 108 are inserted along respective axes that are offset (equally) from the axis A. As shown, these fasteners 108 can extend parallel to the diagonal direction D. The fasteners 108 can include spaced upper and lower fasteners that extend through respective apertured fastener flange portions 110 of the motor case 72 and into the battery case 60 (e.g., left battery case shell 60L). The battery case 60 can include threaded apertures for securement of the fasteners 108 and clamping of the battery case 60 and the motor case 72 along the diagonal direction D. In other constructions, one or both of the fasteners 108 can have an alternate orientation, for example more vertical or more horizontal than the particular diagonal orientation shown. The flange portions 110 of the motor case 72 can include gussets, reinforced blocks, or any suitable structure for creating locally strengthened areas. When the motor case 72 and the battery case 60 are secured together, a gap may exist therebetween along the diagonal direction. The outer cylindrical surface of the motor case 72 need not contact or seal with the adjacent outer surface portion of the battery case 60. Loads from the rear wheel 24 to the swingarm 44 are borne by the motor case 72 and the battery case 60. In particular, loads at the swingarm 44 are transmitted to the motor case 72 and the battery case 60 directly via the connections at the swingarm mounts 82, 82' or to the motor case 72 and the battery case 60 indirectly via the rear suspension. In particular, the battery case 60 includes a first suspension mounting point 60C and the motor case 72 includes a second suspension mounting point 72C. In the illustrated embodiment, the rear swingarm 44 is connected to the shock absorber unit 46 through an intermediate link 112, but other alternative suspension configurations are also contemplated. The first suspension mounting point 60C, provided at the rear side of the battery case 60, is a shock absorber mount for a first (upper) end of the shock absorber unit 46. The second suspension mounting point 72C, provided at the top of the motor case 72, is a suspension link mount for the intermediate suspension link 112.

Returning to the electronics, FIG. 6 illustrates an inverter 120 configured for connection with a main power supply connection 124 of the motor 58. The inverter 120 can be constructed with a number of components on a circuit board assembly operable to supply a controlled driving current to the motor 58 (e.g., based upon the rider's request of a throttle control such as a twist grip). The main power supply connection 124 of the motor 58 can include three terminals corresponding to three-phase AC supply from the inverter 120. As such, cables in the form of three AC motor leads 128 are provided for establishing the connection between the inverter 120 and the motor 58. The main power supply connection 124 and the connecting ends of the AC motor leads 128 are located in the space 106. Under conditions in which the motor 58 converts mechanical energy to electrical energy during regenerative braking, electrical power generated from the motor 58 is sent to the inverter 120 through the AC motor leads 128.

Figure 8:
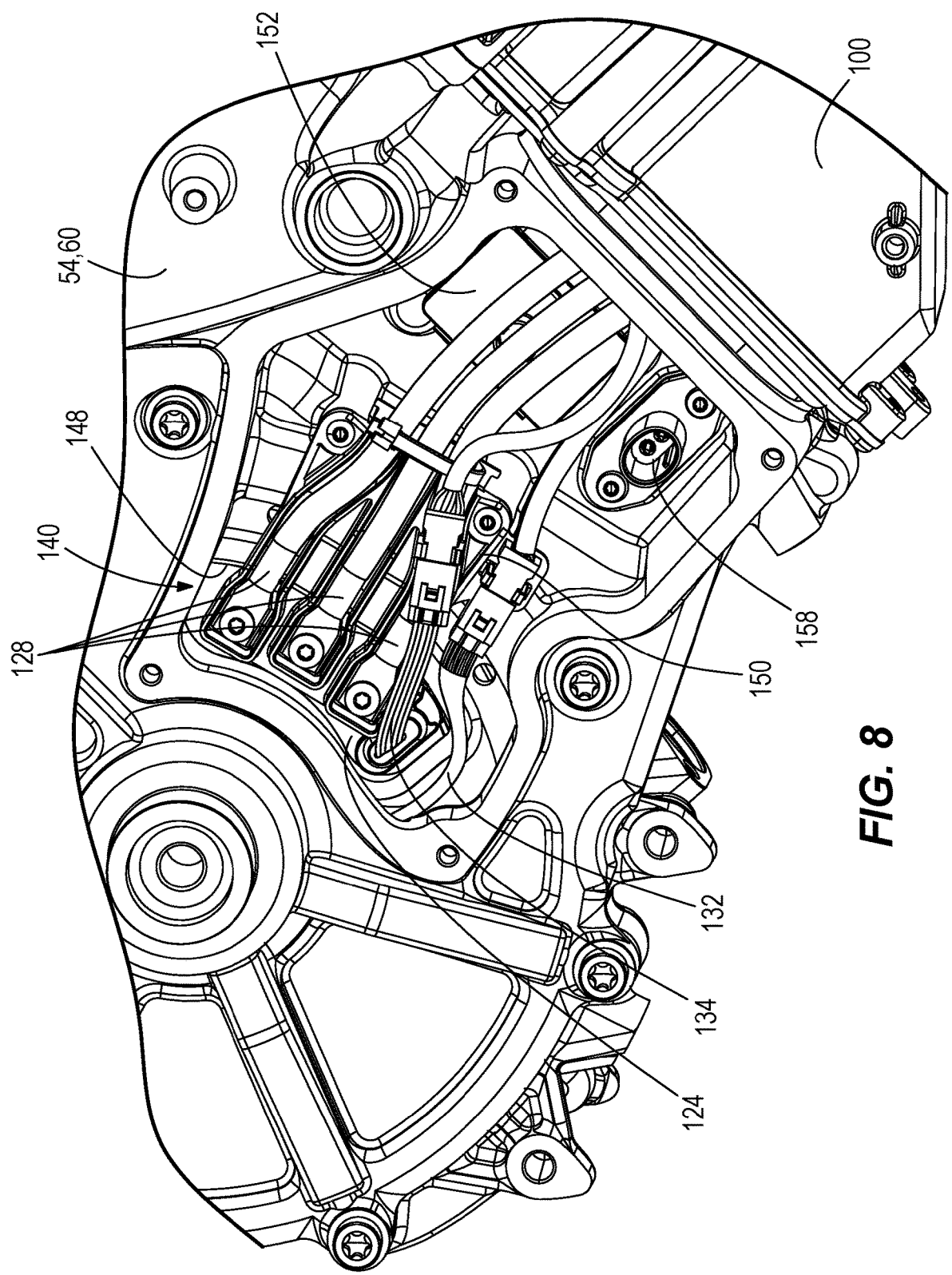
FIG. 8 is a detail view of the electrical connections within an integral cavity of the battery pack housing.

As best shown in FIGS. 6 and 8, one or more additional cables for motor telemetry are provided between the motor 58 and the power electronics enclosure 100. For example, the telemetry cables can include either or both of: a cable 132 coupled to the motor speed sensor 104 and a cable 134 coupled to a motor temperature sensor 136. Each of the cables 132, 134 can have plug-type connectors for making and breaking the connections provided by the cables 132, 134. The motor-facing ends of each of the cables 132, 134 can be located in the space 106. The cables 132, 134 can extend alongside the AC motor leads 128.

The AC motor leads 128 are not exposed to the environment, but rather concealed within a portion of the battery case 60, particularly a portion of the motor flange 88 provided by the right battery case shell 60R. This portion of the motor flange 88 provides an integrated junction box 140. The integrated junction box 140 of the illustrated construction extends from a bottom-front corner of the battery case 60 (right battery case shell 60R) toward a center of the electric motor 58 (i.e., toward the axis A) in side view of the motorcycle 20. Other shapes and positions of the integrated junction box 140 are possible, depending in some cases upon the relation between the power electronics housing 100 and the various electrical connectors on the motor 58 such that the junction box 140 generally spans therebetween. The junction box 140 has a removable exterior cover panel 144 providing selective access to the interior of the junction box 140, and the access can be provided by removing the cover panel 144 while the motor 58 and the battery case 60 are assembled together (during or following assembly of the motorcycle 20). An interior window 148 opens from the junction box 140 to the space 106. As can be appreciated from FIG. 8 in particular, the window 148 is provided along an interior of the junction box 140 and along an exterior of the electric motor 58 at the location of the main power supply connection 124. As such, connection (or disconnection) of the AC motor leads 128 to (or from) the motor 58 can be accomplished from the outside via access provided by the junction box 140 with the cover panel 144 removed.

In addition to the AC motor leads 128 extending through integrated junction box 140, any one or more additional functions may be provided by the junction box 140 as described here. For example, the illustrated construction provides for extension of the telemetry cables 132, 134 through the junction box 140. A cable organizer 150 can be provided within the junction box 140. For example, the cable organizer 150 can be fastened (e.g., with screws) into a prescribed location in the junction box 140, along an interior wall thereof. The cable organizer 150 can include locators for individual cables, the locators establishing a predefined position or pathway for each cable, and optionally snapping or latching the cable(s) into place. The cable organizer 150 can include locators for any/all of: the AC motor leads 128, and the telemetry cables 132, 134. Moreover, an electrical connection (DC) between the battery pack 54 and the power electronics housing 100 (electrical energy supply from the cells 65 to the inverter 120) is made through the junction box 140. More particularly, FIG. 9 illustrates a pair of DC connections 152 (e.g., cables, bus bars, etc.) connecting the main high voltage leads 154 of the battery pack 54 to the inverter 120 through an inverter DC link capacitor 156. An interlock 158 (e.g., normally-open switch) automatically opens the high voltage connection between the battery pack 54 and the electric motor 58 in response to removal of the cover panel 144 such that high voltage is not present at any of the components directly accessible through the junction box 140.

To establish a passageway to the interior of the power electronics housing 100, a port 162 extends from the junction box 140. In the illustrated construction, the port 162 is formed in a forward-facing surface or edge of the motor flange 88 of the battery case 60, extending along a path that intersects with the junction box 140. The cross-section shape of the port 162 is rounded (e.g., circular, elliptical, oval). A complementary port 164 of the power electronics housing 100 is provided to mate with the port 162 and form a sealed interface, for example by way of a perimeter seal 166. In the illustrated construction, the port 164 of the power electronics housing 100 has a male configuration configured for insertion within the female-configured port 162 of the motor flange 88. Further, the port 164 is formed at a bottom-rear of the power electronics housing 100. The perimeter seal 166 is supported on the male-configured port 164 to establish continuous perimeter contact with the interior of the port 162. The perimeter seal 166 does not rely on assembly clamp force between the battery case 60 and the power electronics housing 100, and the perimeter seal 166 functions to seal the interface independent of the exact depth of insertion of the port 164 into the port 162. The sealed interface between the battery case 60 and the power electronics housing 100 is accommodative of angular misalignment, rather than requiring exacting tolerances and alignment for proper function. When mated together, the ports 162, 164 establish a pathway between the junction box 140 and an interior of the power electronics housing 100. This pathway is used for a plurality of functional electrical connections, including the AC power leads 128, the telemetry cables 132, 134, and the DC connections 152 between the battery pack 54 and the inverter 120. In fact, the junction box 140 may facilitate all electrical connections to the motor 58 on a single lateral side (e.g., non-drive side) of the motor 58. In such cases, all electrical connections to the motor 58 may be accessible for connection and disconnection from the integrated junction box 140, when the cover panel 144 is removed.

Various features and advantages of the invention are set forth in the following claims.

What is claimed is:

1. An electric motorcycle comprising:
   an electric motor configured to provide propulsion of the motorcycle; and
   a battery pack including a battery case,
   wherein the electric motor and the battery case are coupled together to define an overlapping area,
   wherein, in the overlapping area, the battery case forms an integrated junction box for one or more electrical connections to the electric motor, and
   wherein, with the electric motor and the battery case coupled together, the integrated junction box provides selective access to the one or more electrical connections without opening the battery case.

2. The electric motorcycle of claim 1, wherein a rotor and an output shaft of the electric motor extend along a horizontal transverse axis across the motorcycle.

3. The electric motorcycle of claim 1, wherein the battery case includes a motor flange in the overlapping area, the motor flange overlapping at least a portion of the electric motor in side view of the motorcycle, and wherein the electric motor and the motor flange are clamped together in a transverse horizontal direction.

4. The electric motorcycle of claim 3, wherein a motor case of the electric motor and the battery case are stressed frame members of the motorcycle in lieu of a separate frame between front and rear wheels of the motorcycle.

5. The electric motorcycle of claim 1, wherein the integrated junction box includes an interior window providing access to a main power supply connection on the electric motor.

6. The electric motorcycle of claim 5, wherein the integrated junction box further includes an access port that is selectively closed with a cover panel and a power electronics port forming a sealed interface with a power electronics housing that contains an inverter electrically connected to both the battery pack and the electric motor.

7. The electric motorcycle of claim 6, wherein an electrical connection between the battery pack and the inverter is made through the integrated junction box.

8. The electric motorcycle of claim 1, wherein the integrated junction box extends from a bottom-front corner of the battery case toward a center of the electric motor in side view of the motorcycle.

9. The electric motorcycle of claim 1, wherein all electrical connections to the electric motor are made on one lateral side of the electric motor and accessible for connection and disconnection from the integrated junction box.

10. An electric motorcycle comprising:
    a battery pack including a plurality of rechargeable electrochemical cells received within an internal cell cavity of a battery case; and
    an electric motor connected to receive stored energy from the plurality of rechargeable electrochemical cells, the electric motor having an output on a drive side thereof connected to drive a wheel of the motorcycle,
    wherein the electric motor is coupled to a motor mounting portion of the battery case extended from the cell cavity, and
    wherein a cable connected to the electric motor to supply electrical power to drive the electric motor is concealed within the motor mounting portion, and the cable is selectively accessible without opening the battery case.

11. The electric motorcycle of claim 10, wherein the motor mounting portion of the battery case is a longitudinally-extending flange situated directly outboard of one lateral side of the electric motor which is opposite the drive side, and wherein the electric motor and the motor flange are clamped together in a transverse horizontal direction.

12. The electric motorcycle of claim 11, wherein a motor case of the electric motor and the battery case are stressed frame members of the motorcycle in lieu of a separate frame between front and rear wheels of the motorcycle.

13. The electric motorcycle of claim 10, wherein the cable is one of a set of AC motor leads connected to the electric motor to supply electrical power to drive the electric motor, the entire set of AC motor leads being concealed within the motor mounting portion and selectively accessible by removal of a cover panel to enable connection with and disconnection from the electric motor.

14. The electric motorcycle of claim 10, further comprising a telemetry cable concealed within the motor mounting portion, the telemetry cable extending between a motor sensor and a controller positioned remote from the motor.

15. The electric motorcycle of claim 10, wherein the motor mounting portion includes an integrated junction box defining a space for the cable, and wherein an interior window opens from the junction box to a sealed spaced along an exterior of the electric motor where a main power supply connection on the electric motor is located.

16. The electric motorcycle of claim 15, further comprising a power electronics port extending from the junction box, wherein the power electronics port forms a sealed interface with a power electronics housing that contains an inverter electrically connected to both the battery pack and the electric motor.

17. The electric motorcycle of claim 16, wherein an electrical connection between the battery pack and the inverter is made through the integrated junction box.

18. The electric motorcycle of claim 15, wherein the integrated junction box extends from a bottom-front corner of the battery case toward a center of the electric motor in side view of the motorcycle.

19. An electric motorcycle comprising:
a battery pack including a plurality of rechargeable electrochemical cells received within an internal cell cavity of a battery case;
an electric motor connected to receive stored energy from the plurality of rechargeable electrochemical cells, the electric motor having an output on a drive side thereof connected to drive a wheel of the motorcycle;
a rear wheel drivably coupled to the electric motor output on the drive side to propel the motorcycle; and
a power electronics housing separate from the battery pack and the electric motor, the power electronics housing containing an inverter electrically connected to both the battery pack and a main power supply connection of the electric motor for discharging power from the battery pack to the electric motor to provide propulsion of the electric motorcycle,
wherein, separate from the internal cell cavity, the battery case forms an integrated junction box that provides sealed passage of all electrical connections between the battery pack and the inverter and all electrical connections between the inverter and the electric motor, wherein the integrated junction box is provided alongside a non-drive side of the electric motor, the integrated junction box providing selective access to the main power supply connection of the electric motor without opening the battery case.

20. The electric motorcycle of claim 19, wherein the integrated junction box is formed in a structural motor flange of the battery case to which a motor case of the electric motor is joined to define a frame of the motorcycle between the rear wheel and a steerable front wheel.

* * * * *